United States Patent
Jung

(10) Patent No.: US 8,108,018 B2
(45) Date of Patent: Jan. 31, 2012

(54) CELLULAR PHONE WITH A GUIDE MEMBER AND SLIDING MEMBER WITH INSERT MEMBER HAVING A GUIDE GROOVE

(75) Inventor: Eun-Suk Jung, Suwon (KR)

(73) Assignee: Diabell Co., Ltd., Anyang-Si, Gyeongsi-Do (KR)

( * ) Notice: Subject to any disclaimer, the term of this patent is extended or adjusted under 35 U.S.C. 154(b) by 430 days.

(21) Appl. No.: 12/376,610

(22) PCT Filed: Aug. 7, 2007

(86) PCT No.: PCT/KR2007/003787
§ 371 (c)(1),
(2), (4) Date: Feb. 6, 2009

(87) PCT Pub. No.: WO2008/018735
PCT Pub. Date: Feb. 14, 2008

(65) Prior Publication Data
US 2010/0184491 A1   Jul. 22, 2010

(30) Foreign Application Priority Data
Aug. 8, 2006 (KR) .................. 10-2006-0074544

(51) Int. Cl.
*H04M 1/00* (2006.01)
(52) U.S. Cl. .................. 455/575.4; 455/575.1; 361/814
(58) Field of Classification Search .............. 455/575.4, 455/575.1; 361/814
See application file for complete search history.

(56) References Cited

U.S. PATENT DOCUMENTS

| | | | |
|---|---|---|---|
| 7,831,285 B2* | 11/2010 | Lee | 455/575.4 |
| 2005/0009581 A1 | 1/2005 | Im et al. | |
| 2006/0205450 A1* | 9/2006 | Amano et al. | 455/575.4 |
| 2010/0022286 A1* | 1/2010 | Wang et al. | 455/575.4 |

FOREIGN PATENT DOCUMENTS

| | | |
|---|---|---|
| KR | 10-2005-0078088 | 8/2005 |
| KR | 10-2006-0037685 | 5/2006 |
| KR | 10-2006-0037795 | 5/2006 |

OTHER PUBLICATIONS

International Search Report dated Oct. 9, 2007.

* cited by examiner

*Primary Examiner* — James H Cho
(74) *Attorney, Agent, or Firm* — KED & Associates, LLP

(57) ABSTRACT

A phone is provided. The phone comprises a first body having a first face, a second body having a second face facing the first face and connected to the first body so as to be slidable in a moving direction parallel to the first and second faces, guiding members protruding from the first face, and a sliding member mounted on the second face and guiding the guiding members so as to slide in the moving direction. The sliding member includes insert members, each of which has a guide groove, disposed parallel to the moving direction to allow the respective guiding members to be inserted thereinto and housings fixedly mounted on the second face to house the respective insert members. The space defined by the first body and the second body is minimized. With this configuration, the first body is movable in a circular arc direction relative to the second body and has the same curvature as the second body.

6 Claims, 3 Drawing Sheets

[Fig. 1]
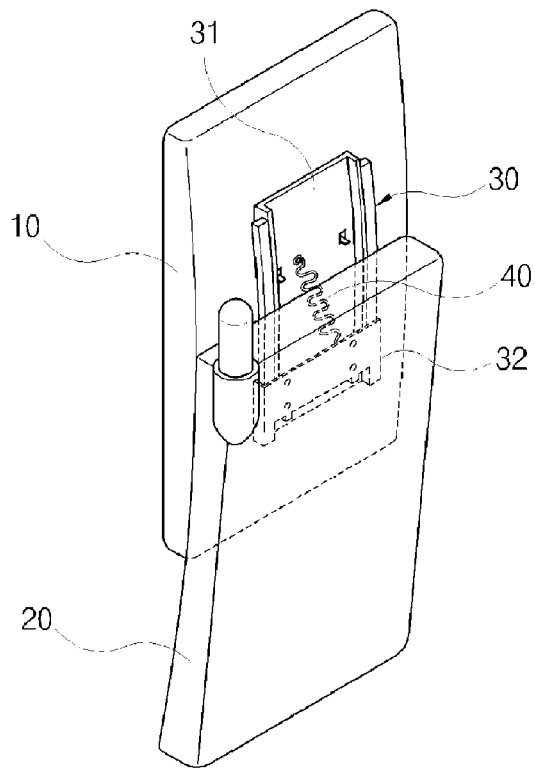
[Fig. 2]
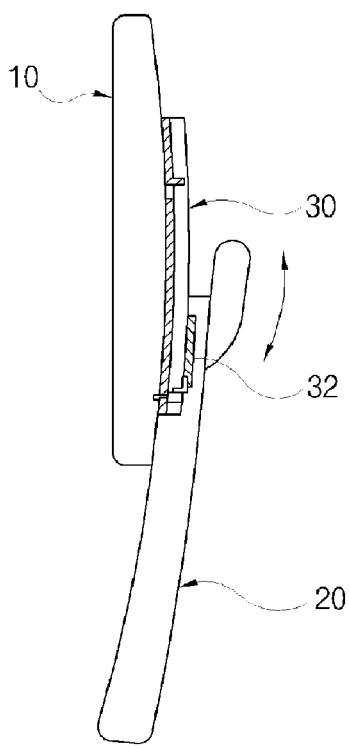

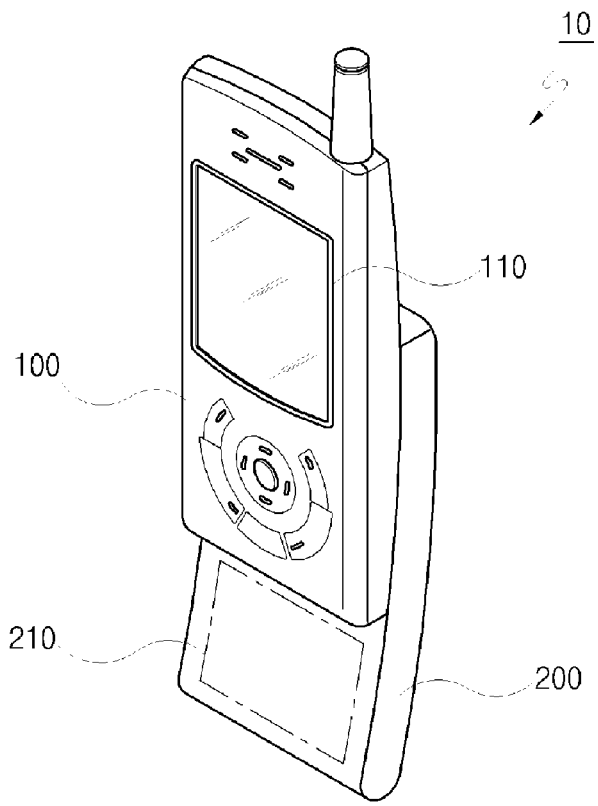
[Fig. 3]
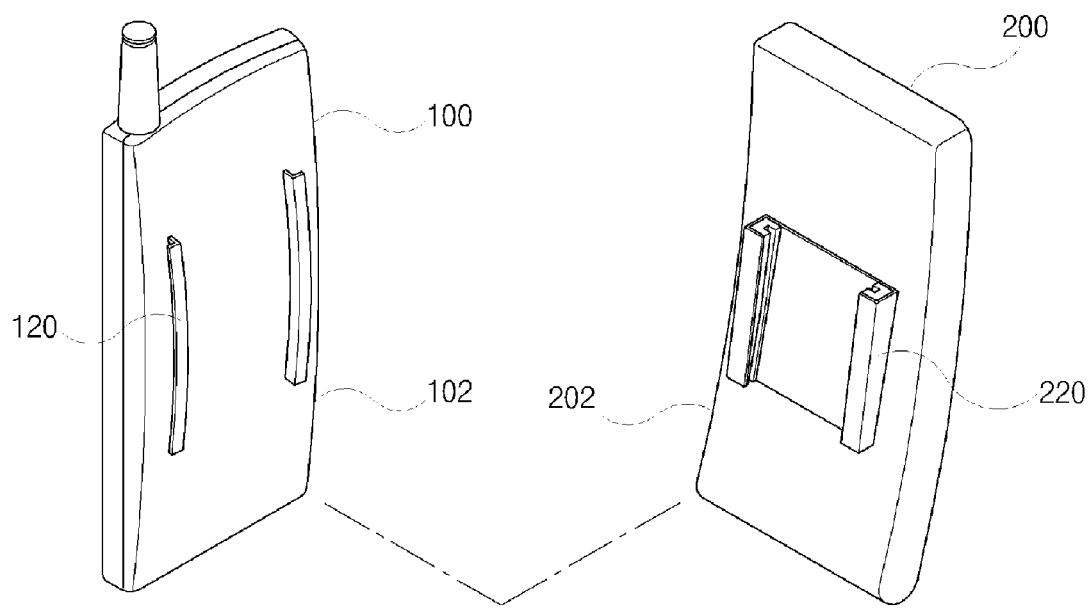
[Fig. 4]

[Fig. 5]
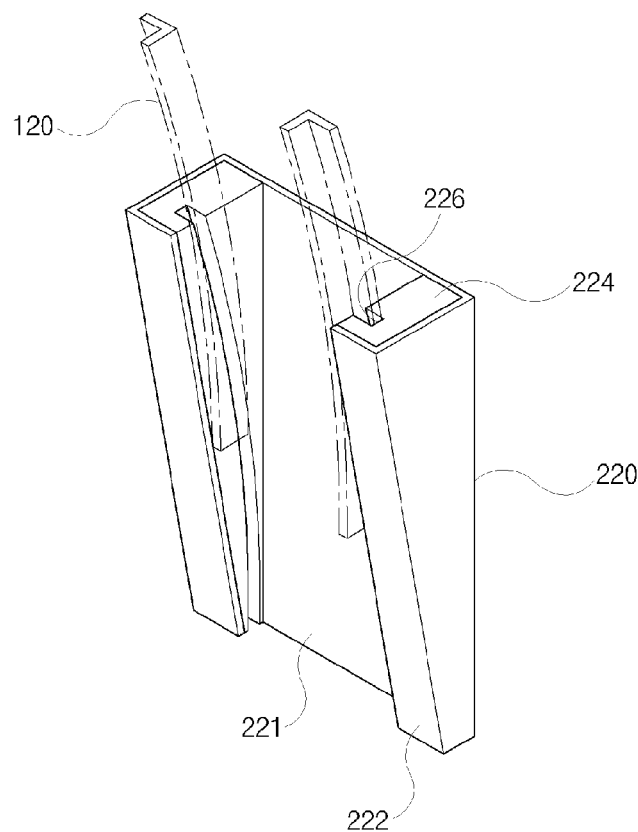
[Fig. 6]
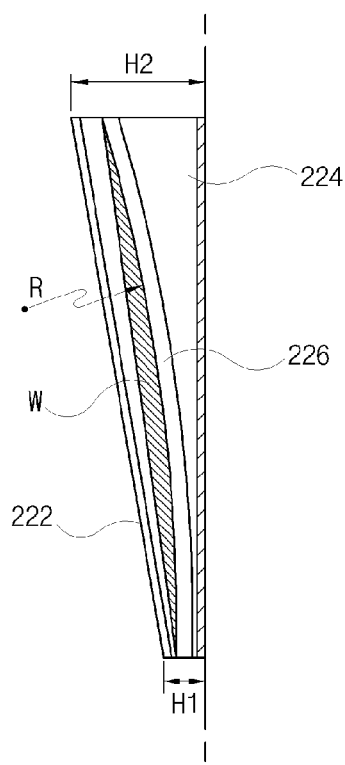

CELLULAR PHONE WITH A GUIDE MEMBER AND SLIDING MEMBER WITH INSERT MEMBER HAVING A GUIDE GROOVE

TECHNICAL FIELD

The present invention relates to a phone, and more particularly to a phone comprising a first body and a second body moving relative to the first body and having a minimized space between the first and second bodies.

BACKGROUND ART

With the widespread use of cellular phones, various types of cellular phones have been emerged in the market for satisfying various user demands. The physical designs of cellular phones have been evolved from a bar type to folder and slide types via intermediate flip and flip-up types. A typical slide type cellular phone is characterized in that a sliding body is slidably moved to a predetermined position in the lengthwise direction on a main body so that a user can push and pull the sliding body to open and close the cellular phone, which enables the user to use the slide type cellular phone in a simpler manner. This operational mechanism can ensure slimness and compactness of sliding type cellular phones while maintaining a large display screen size similar to folder type cellular phones. Based on these advantages, sliding type cellular phones are currently recognized as high-grade phones. Recently, sliding type cellular phones have employed an automatic sliding mechanism wherein a sliding body is completely slid up by pushing it to a predetermined position. Under such circumstances, various sliding units have been developed to realize the automatic sliding mechanism.

A sliding type cellular phone is disclosed in Korean Registered Utility Model No. 387257, which was filed by the present applicant. The sliding type cellular phone will be briefly explained below.

As shown in FIGS. 1 and 2, a sliding unit 30 is disposed between a first body 10 and a second body 20 whose faces are at an obtuse angle. The first and second bodies 10 and 20 are curved to have a predetermined curvature, so that the first body 10 can be moved relative to the movement of the second body 20 in a circular arc direction. The sliding unit 30 includes a first sliding member 31 mounted on the facing surface of the first body 10 and a second sliding member 32 mounted on the facing surface of the second body 20. The first body 10 is sliding up and down relative to the second body 20 by means of the sliding unit 30. The first and second sliding members 31 and 32 are arranged at an obtuse angle and are united together by guide rails. The guide rails have the same curvature as the first and second sliding members 31 and 32, and as a result, the first body 10 is slid up and down along the second body 20. The sliding unit 30 is provided with a pin spring 40 to allow the first and second sliding members 31 and 32 to be supported to each other by an elastic force and slidable with respect to each other. A space is provided between the facing surfaces of the first and second bodies 10 and 20 to prevent the pin spring 40 from interfering with the facing surfaces of the first and second bodies 10 and 20 upon the sliding movement of the first and second bodies 10 and 20 in a circular arc direction.

However, the space defined by the facing surfaces of the first and second bodies 10 and 20 makes it difficult to secure spaces for other elements, causing many limitations in the compactness and slimness of cellular phones in size.

In the meantime, the first and second sliding members and guide rail are formed of a metallic material by press molding so as to have the same curvature. However, the press molding is a very complicated process to perform and causes various unexpected problems such as wear of a press arising from repeated operations, variation in the thickness of metallic materials and proficiency of operators.

DISCLOSURE OF INVENTION

Technical Problem

The present invention has been made in an effort to solve the above problems, and it is an object of the present invention to provide a cellular phone which comprises a first body and a second body coupled to the first body with a minimized space defined by the first and second bodies such that the first body is movable in a circular arc direction relative to the second body and has the same curvature as the second body.

Technical Solution

According to the present invention, there is provided a phone comprising: a first body having a first face; a second body having a second face facing the first face and connected to the first body so as to be slidable in a moving direction parallel to the first and second faces; guiding members protruding from the first face; and a sliding member mounted on the second face and guiding the guiding members so as to slide in the moving direction, wherein the sliding member includes insert members, each of which has a guide groove, disposed parallel to the moving direction to allow the respective guiding members to be inserted thereinto and housings fixedly mounted on the second face to house the respective insert members.

Preferably, the guiding members and the guide grooves are arranged parallel to the moving direction. The housing may further include a base plate disposed to face the second face and bent members protruding from the base plate toward the first face to surround the respective insert members.

Preferably, the bent members are arranged parallel to the moving direction and are tapered to have different heights at their both ends.

Preferably, the phone of the present invention may further comprise an elastic member that is positioned between the guiding members and the sliding member so as to be moved within the height range of the sliding member and that allows the first body to slide relative to the second body.

Preferably, the first face is convex with respect to the second face, and the second face is concave with respect to the first face and has the same radius of curvature as the first face. The guiding members may be integrally formed with the first body.

Preferably, the first body includes a display part disposed on a face opposite to the first face and the second body includes a keypad disposed on the second face.

Advantageous Effects

The phone of the present invention is characterized in that the space defined by the first body and the second body coupled to the first body is minimized. With this configuration, the first body is movable in a circular arc direction relative to the second body and has the same curvature as the second body.

In addition, since the guiding members are integrally formed with the first body, the narrowing of the space defined by the first and second bodies can be achieved.

BRIEF DESCRIPTION OF THE DRAWINGS

FIG. 1 is a perspective view illustrating a conventional phone;

FIG. 2 is a cross-sectional view illustrating the phone of FIG. 1;

FIG. 3 is a perspective view illustrating a phone of the present invention;

FIG. 4 is a dissembled perspective view illustrating upper and lower bodies of the phone of FIG. 3;

FIG. 5 is an enlarged perspective view illustrating a sliding member of the cellular phone of FIG. 3; and FIG. 6 is a cross-sectional view illustrating the sliding member of FIG. 5.

MODE FOR THE INVENTION

Preferred embodiments of the present invention will now be described with reference to FIGS. 3 to 6. It should be noted that the present invention may be embodied in various different forms, and therefore, the present invention is not limited to the illustrated embodiments. The following embodiments serve to explain the principles of the present invention to those skilled in the art. Elements in the drawings are may be exaggerated relative to other elements to help understanding the embodiments of the present invention.

Although a cellular phone is illustrated in the following embodiments to explain the present invention, the spirit and scope of the invention are not limited thereto. The present invention can be applied to a variety of electronic devices, including cellular phones.

Referring to FIGS. 3 to 5, a sliding type cellular phone 10 comprises an upper body 100 having a display part 110 for displaying communication-related information and a lower body 200 having a keypad 210 provided with a plurality of keys for inputting data, the upper body 100 being movable relative to the lower body 200 by means of a sliding member 220 mounted on the lower body 200 and guiding members 120 formed on the upper body 100.

The guiding members 120 protrude from the upper body 100 and are integrally formed with the upper body 100. The guiding members 120 have an "L" shape and face each other. The guiding members have the same curvature as a curved surface 102 of the upper body 100.

The sliding member 220 is coupled to an inner surface of the lower body 220. The sliding member 220 includes a planar base plate 112 and an "L"-shaped bent portions 222 protruding at both ends of the base plate 221. An elastic member (not shown) connecting to the inner surface of the upper body 100 is coupled to the base plate 221. Each of the bent portions 222 is tapered to have different heights at its both ends. This tapering prevents the elastic member from being in contact with the upper and lower bodies while the upper body 100 moves relative to the lower body 200 along the bent portions 222 and allows sliding movement between the upper and lower bodies with a minimized space defined by the first and second bodies. The bent portions 222 are formed using a press.

The sliding member 220 is provided with insert members 224 within the respective bent portions 222. The insert members 224 are formed of plastic by injection molding. Guide grooves 226 having the same curvature as the guiding members are formed within the respective insert members 224. As a result, the guiding members 120 are slidably moved within the sliding member 220, which eliminates the need to provide a relatively large space between the upper and lower bodies 100 and 200.

Referring to FIG. 6, assuming that the upper and lower ends of each bent portion are H2 and H1 and the curvature of each guide rail 226 is R, the curvature R is determined within the height range of H1 and H2. A straight-line section W is defined by the curvature R. The section W refers to a section where the straight-line motion of the elastic member (not shown) occurs upon the movement of the first body relative to the second body. In a conventional phone, a straight-line movement section W of an elastic member is defined within a groove formed a body to ensure the movement space of the elastic member. In the phone of the present invention, since the upper and lower ends of each bent portion have different heights and the curvature is determined within the height difference range, there is no need to form a groove in the lower body. In addition, the curvature R of the upper and lower bodies may be changed by varying the heights of H1 and H2.

Since the bent portions 222 are formed of a metal using a press and the insert members 224 are formed of plastic by injection molding within the respective bent portions 222, the guiding members have the same curvature as the guide rails, thereby guaranteeing excellent workability.

It will be obvious to those skilled in the art that the guiding members 120 can be formed on the lower body 200 other than the upper body 100.

Although the present invention has been described in detail with reference to the foregoing preferred embodiments, the spirit and scope of the present invention are not limited to the embodiments. Accordingly, those skilled in the art will appreciate that various modifications are possible, without departing from the spirit of the present invention.

INDUSTRIAL APPLICABILITY

The present invention can be applied to a variety of devices and products requiring a sliding operation.

The invention claimed is:

1. A phone comprising:
    a first body having a first face;
    a second body having a second face, the second body being connected to the first body so that the second face faces the first face and being able to slide in a moving direction parallel to the first and second faces;
    a guiding member protruding from the first face; and
    a sliding member mounted on the second face, the sliding member guiding the guiding member so as to slide in the moving direction,
    wherein the sliding member includes a insert member which has a guide groove formed parallel to the moving direction to allow the guiding member to be inserted thereinto and housing fixedly mounted on the second face to house the insert member,
    wherein the housing further includes a base plate disposed to face the second face and a bent member protruding from the base plate toward the first face to surround the insert member, and
    wherein the bent member is arranged parallel to the moving direction and has different heights at their both ends.

2. The phone according to claim 1, wherein the guiding member and the guide groove are disposed parallel to the moving direction.

3. The phone according to claim 1, further comprising an elastic member that is positioned between the guiding member and the sliding member so as to be moved within the height range of the sliding member and that allows the first body to slide relative to the second body.

4. The phone according to claim 1, wherein the first face is convex with respect to the second face, and the second face is concave with respect to the first face and ahs the same radius of curvature as the first face.

5. The phone according to claim 1, wherein the guiding members are integrally formed with the first body.

6. The phone according to claim 1, wherein the first body includes a display part disposed on a face opposite to the first face and the second body includes a keypad disposed on the second face.

* * * * *